(12) United States Patent
Kuo

(10) Patent No.: US 6,193,030 B1
(45) Date of Patent: Feb. 27, 2001

(54) HYDRAULIC BRAKE SYSTEM FOR A BICYCLE

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 0 days.

(21) Appl. No.: 09/559,427

(22) Filed: Apr. 27, 2000

(51) Int. Cl.$^7$ .............................. B60T 8/26; B60T 11/16
(52) U.S. Cl. ............................................ 188/344; 188/349
(58) Field of Search .................................. 188/344, 345, 188/349; 303/9.62, 9.64, 9.75

(56) References Cited

U.S. PATENT DOCUMENTS

| | | | |
|---|---|---|---|
| 3,554,334 | * | 1/1971 | Shimano ............................... 188/152 |
| 3,993,174 | * | 11/1976 | Williams et al. ..................... 188/344 |
| 4,494,800 | * | 1/1985 | Hayashi ................................ 188/344 |
| 5,443,134 | * | 8/1995 | Gajek et al. .......................... 188/344 |
| 5,544,946 | * | 8/1996 | Toyoda et al. ........................ 188/344 |
| 5,620,237 | * | 4/1997 | Iwashita et al. ...................... 188/349 |

\* cited by examiner

*Primary Examiner*—Chris Schwartz
(74) *Attorney, Agent, or Firm*—Bacon & Thomas, PLLC

(57) ABSTRACT

A hydraulic brake system for a bicycle includes a body having two inlets respectively connected to two brake levers, and two outlets respectively connected to a front brake assembly and a rear brake assembly. A common groove is defined in the body and communicates with the two inlets and the two outlets by passages. Hydraulic oil filled in the common groove and the passages. An adjusting passage communicates with the common groove and a plug is movably received in the adjusting passage so as to be moved to adjust a communicating between the passages of the front brake assembly and the rear brake assembly.

5 Claims, 6 Drawing Sheets

HYDRAULIC BRAKE SYSTEM FOR A BICYCLE

FIELD OF THE INVENTION

The present invention relates to a hydraulic brake system for a bicycle wherein the rear brake means and the front brake means can be actuated separately or simultaneously.

BACKGROUND OF THE INVENTION

A conventional bicycle brake system generally includes a front brake means for stopping the front wheel, and a rear brake means for stopping the rear wheel of a bicycle. Each brake means includes two calipers located on two sides of a rim and each caliper has a brake pad so that when the brake pads are pushed to contact the rim, the wheel is stopped. The rear brake means and the front brake means are controlled by brake levers on two ends of the handlebar. Two respective brake cables are connected between the brake lever and the brake means. In other words, the front brake means and the rear brake means are operated in separate by pulling the brake levers. Generally, the brake for the rear wheel is to reduce the speed of the bicycle and then the brake for the front wheel is to completely stop the bicycle. However, when in emergency, the rider will pull the two brake levers simultaneously to stop the bicycle in a short time. But when the hands of the rider pull the brake levers, the handlebar tends to loose its control. Furthermore, it is impossible to let the two brake means be actuated simultaneously. If the front brake means is first actuated by a large force, the bicycle could jump and fall.

The present invention intends to provide a brake system wherein the front brake means and the rear brake means can be actuated simultaneously by pulling either of the two brake levers.

SUMMARY OF THE INVENTION

In accordance with one aspect of the present invention, there is provided a hydraulic brake system for a bicycle and comprises a body having two inlets respectively connected to two brake levers, a first outlet and a second outlet. The first outlet is connected to a front brake assembly and the second outlet is connected to a rear brake assembly. A common groove is defined in the body and located between the two inlets and the first outlet and the second outlet. The two inlets communicate with the common groove by two first passages. The first outlet communicates with the common groove by a second passage, and the second outlet communicates with the common groove by a third passage. By the common groove, either brake lever is actuated, the front brake assembly and the rear brake assembly are actuated simultaneously.

The object of the present invention is to provide a hydraulic brake system that actuates the front brake assembly and the rear brake assembly simultaneously by pulling either one of the two brake levers.

Another object of the present invention is to provide a hydraulic brake system that actuates the rear brake assembly with a brake force less than the brake force actuating to the front brake assembly.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
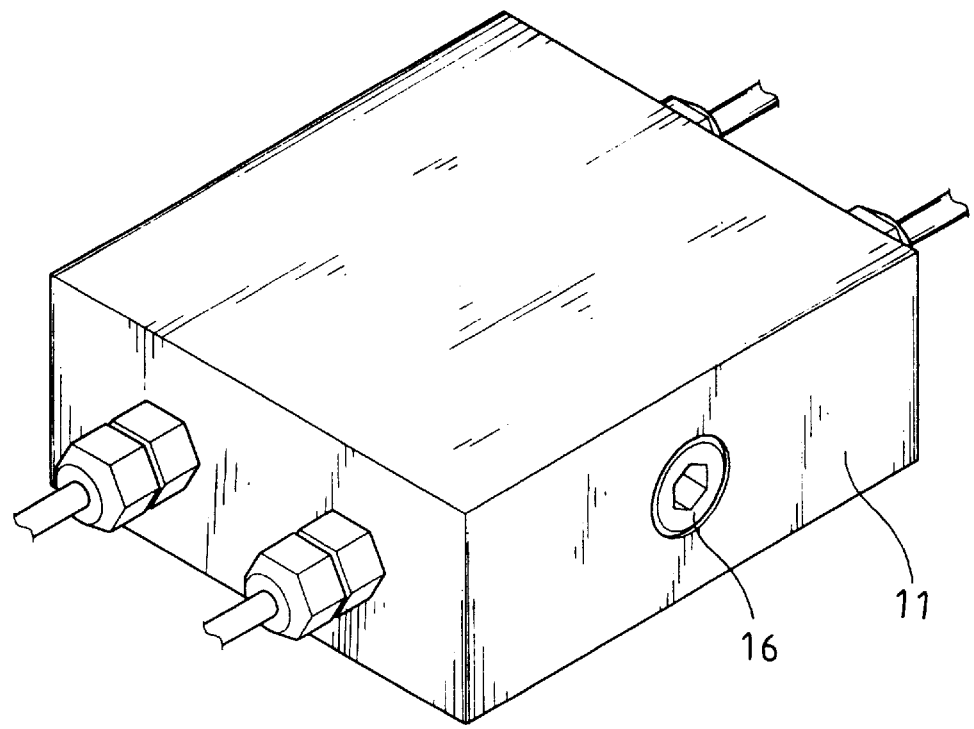
FIG. 1 is a perspective view to show a body of a hydraulic brake system of the present invention.
Figure 3:
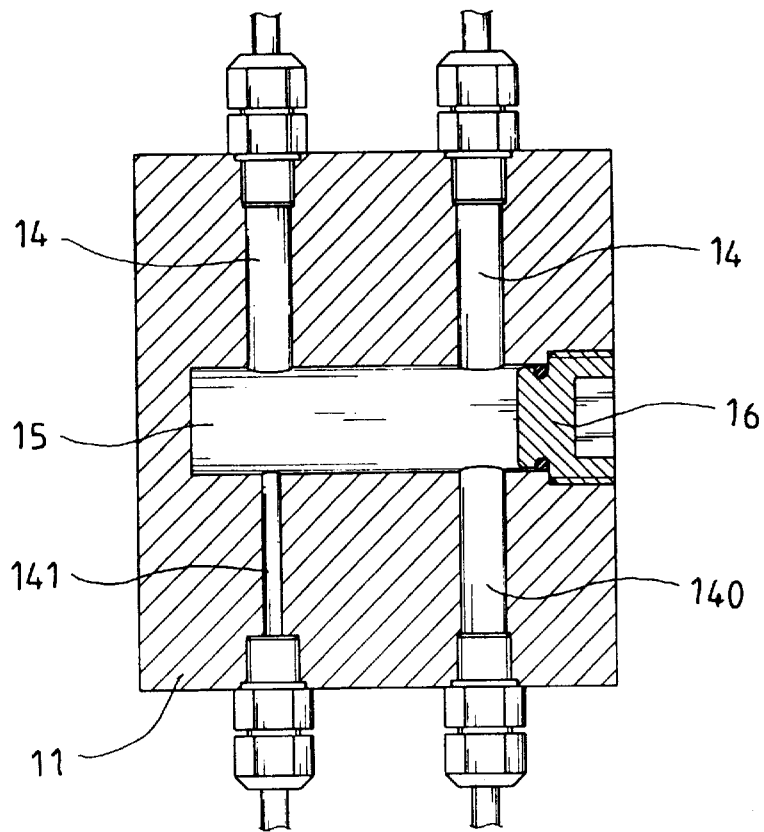
FIG. 3 is a cross sectional view to show the arrangement in the body of the brake system of the present invention.
Figure 2:
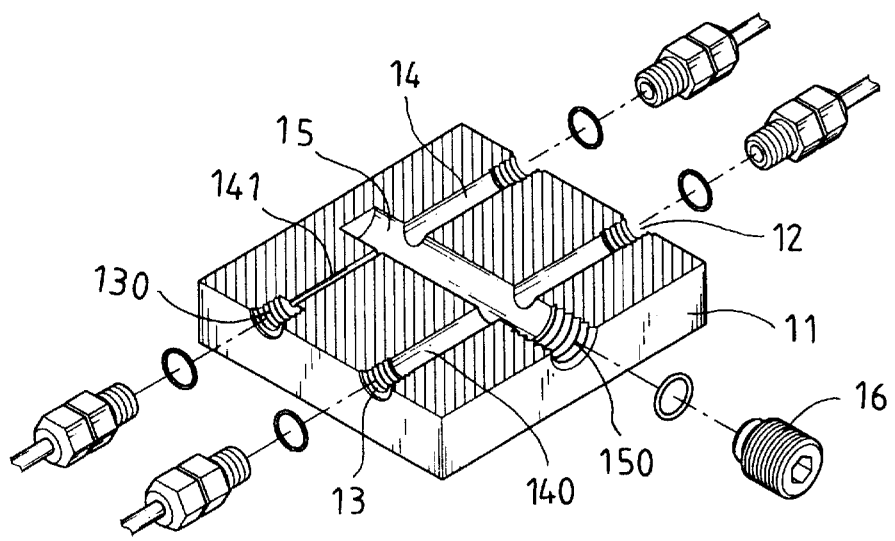
FIG. 2 is an exploded view, partly in section, to show the brake system of the present invention.
Figure 8:
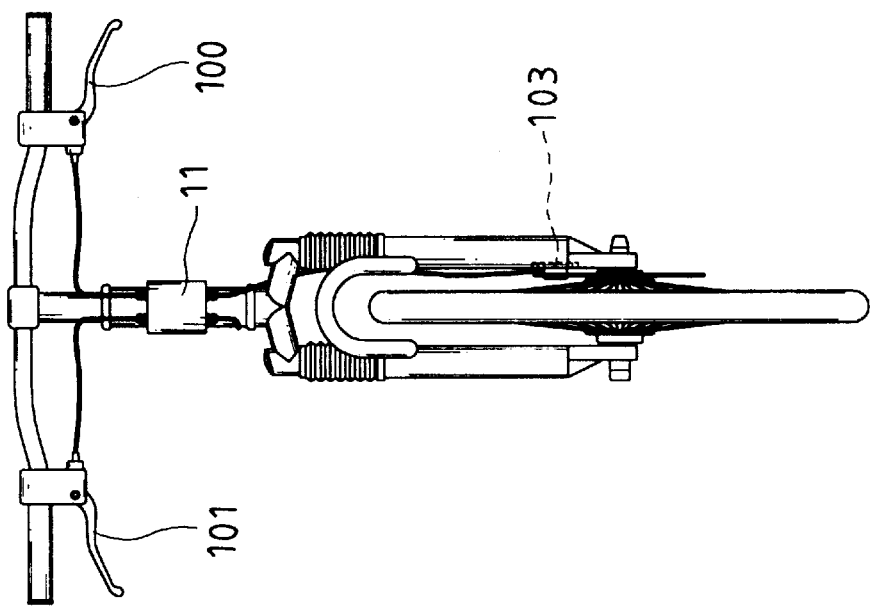
FIG. 8 is an illustrative view to show the body is cooperated with a disk brake system.
Figure 7:
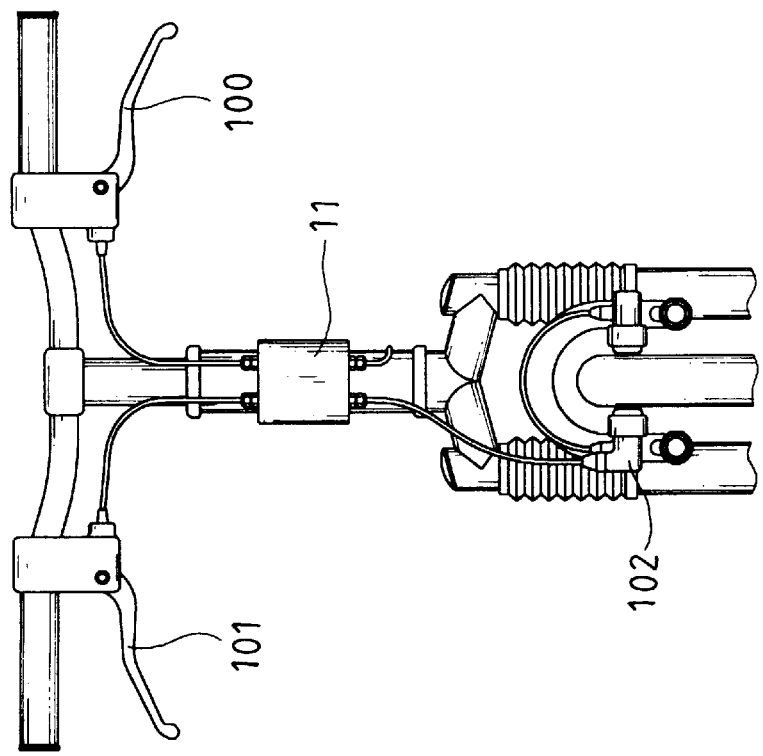
FIG. 7 is an illustrative view to show the body is cooperated with a brake system using calipers.
Figure 9:
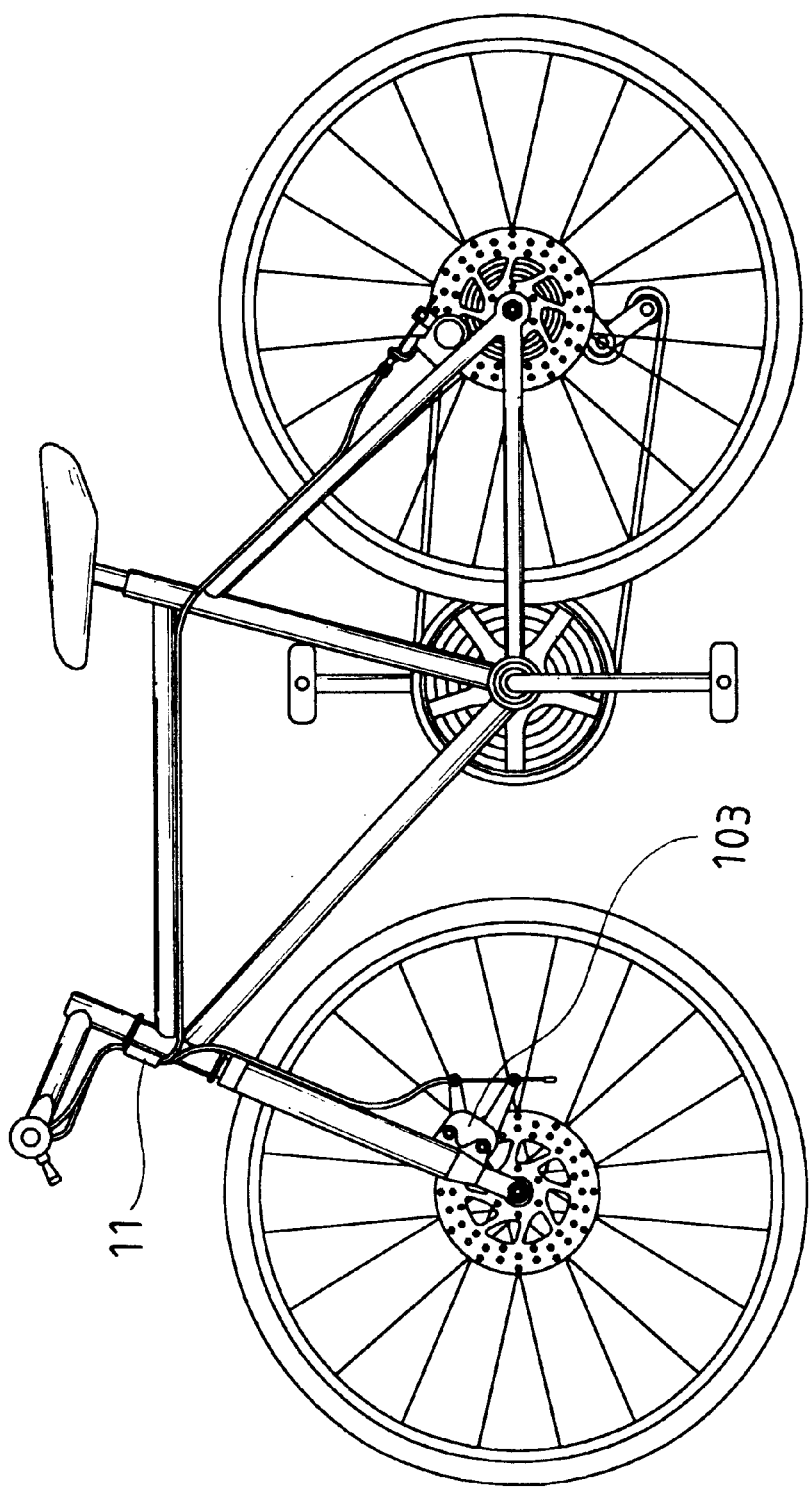
FIG. 9 is a side view to show the body is cooperated with the disk brake system as shown in FIG. 8.

Referring to FIGS. 1 to 3, the hydraulic brake system in accordance with the present invention comprises a body 11 having two inlets 12 defined in a first end of the body 11, and a first outlet 13 and a second outlet 130 respectively defined in a second end of the body 11. A threaded inner periphery is defined in each of the two inlets 12 and the first outlet 13 and second outlet 130 so as to be connected with a fitting. The two inlets 12 are respectively connected to two brake levers 100, 101 as shown in FIG. 7. The first outlet 13 is connected to a front brake assembly such as two calipers 102 in FIG. 7 or a disk clamp 103 in FIGS. 8 and 9. The second outlet 130 is connected to a rear brake assembly. A common groove 15 is defined in the body 11 and located between the two inlets 12 and the first outlet 13 and the second outlet 130. The two inlets 12 communicate with the common groove 15 by two first passages 14 respectively connected between the common groove 15 and the two inlets 12. The first outlet 13 communicates with the common groove 15 by a second passage 140 connected between the common groove 15 and the first outlet 13. The second outlet 130 communicates with the common groove 15 by a third passage 141 connected between the common groove 15 and the second outlet 130. An opening 150 is defined in the body 11 and communicates with the common groove 15, and a seal cap 16 is engaged with the opening 150.

An inner diameter of the second passage 140 is larger than an inner diameter of the third passage 141. Accordingly, when either one of the brake levers 100, 101 is pulled, the hydraulic liquid in the passages 14, 144 and 141 and the common groove 15 will generate an equal pressure in the second passage 140 and the third passage 141. Because the third passage 141 has a smaller diameter, the force applies to the rear brake assembly will be smaller and the force will reduce the speed of the bicycle. A larger force will apply to the front brake assembly to stop the bicycle. It is to be noted that the rear brake assembly and the front brake assembly are actuated simultaneously no matter which brake lever is pulled.

Figure 4:
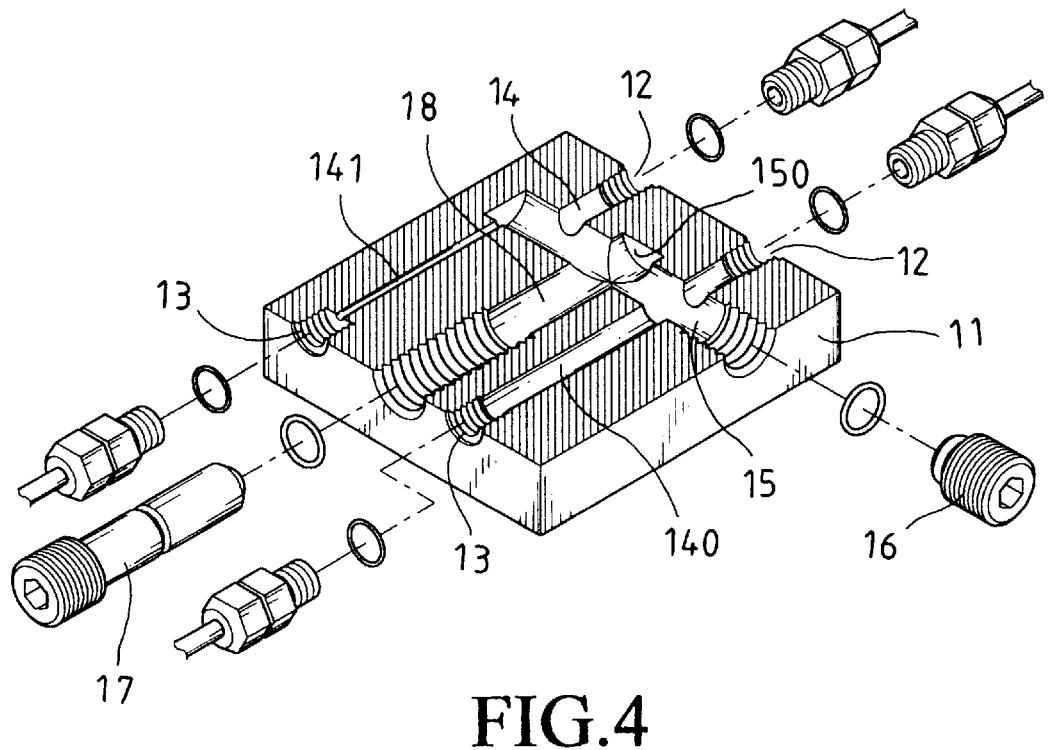
FIG. 4 is an exploded view to show another embodiment of the brake system of the present invention.
Figure 5:
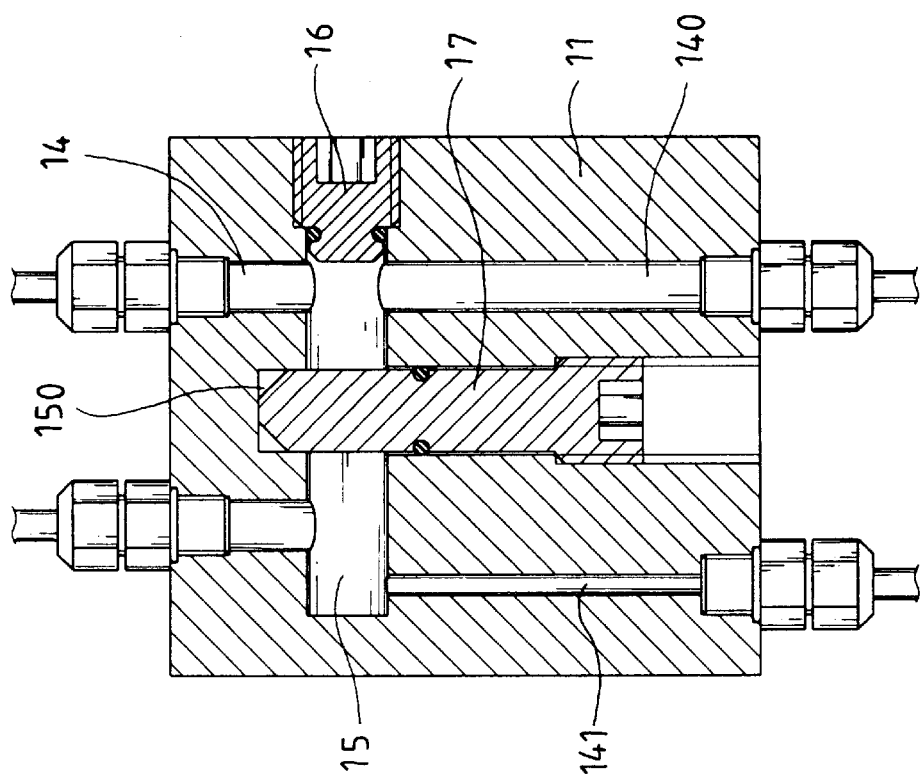
FIG. 5 is a cross sectional view to show the arrangement in the body of the hydraulic brake system as shown in FIG. 4, wherein a plug in an adjusting passage is not moved into the common groove.

FIGS. 4 and 5 show another embodiment of the invention and which has an identical structure as the body 11 shown in FIGS. 1–3 except for an adjusting passage 18 as shown in FIG. 4. The adjusting passage 18 is defined in the body 11 and communicates with the common groove 15. A plug 16 is movably received in the adjusting passage 18. A recess 150 is defined in an inner periphery of the common groove 15, and the recess 150 and the adjusting passage 18 shares a common axis. When the plug 17 is not moved into the common groove 15 as shown in FIG. 5, the functions is the same as described concerning FIGS. 1–3. That is to say, the rear brake assembly and the front brake assembly are actuated simultaneously no matter which brake lever is pulled.

Figure 6:
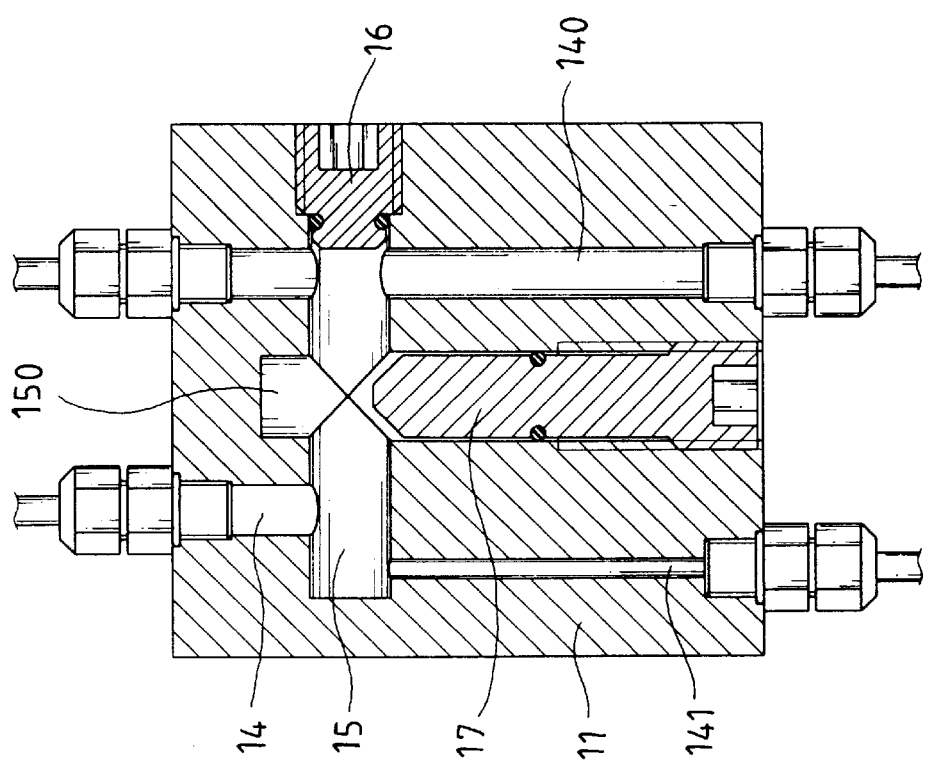
FIG. 6 is a cross sectional view to show the arrangement in the body of the hydraulic brake system as shown in FIG. 4, wherein the plug in the adjusting passage is not moved into the common groove.

As shown in FIG. 6, when the plug 17 is moved into the common groove 15 and a distal end of the plug 17 is received in the recess 150, the space for receiving the hydraulic liquid is separated into two independent partitions. In other words, the front brake assembly can only be actuated by pulling the brake lever 100 which is connected to one of the first passages 14 and the second passage 140. The rear brake assembly can only be actuated by pulling the brake lever 101 which is connected to the other first passages 14 and the third passage 141.

Figure 10:
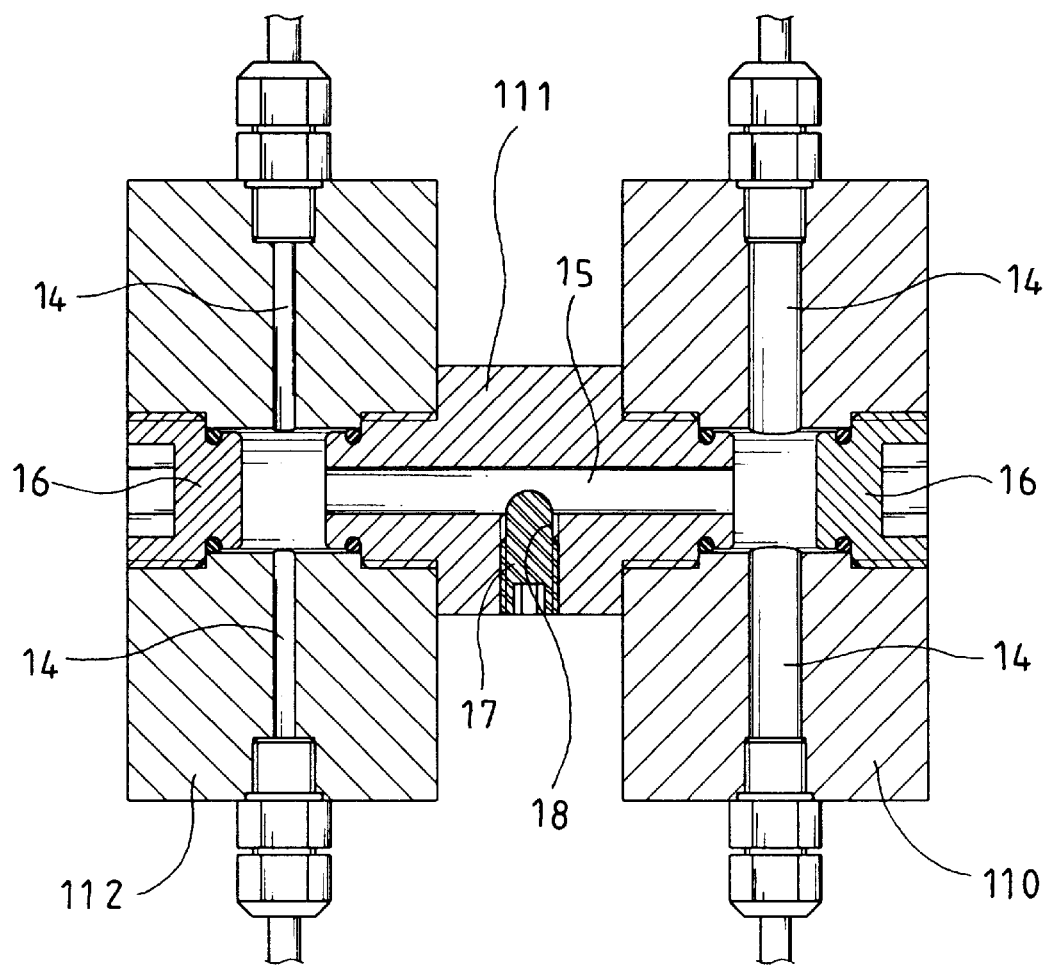
FIG. 10 is a cross sectional view to show yet another embodiment of the hydraulic brake system of the invention.

FIG. 10 shows yet another embodiment of the invention wherein the body is composed by three parts 110, 111, 112. The part 111 is connected between the parts 110 and 112, and the common groove 15 is defined through the part 111. Each of the two parts 110 and 112 has a common groove which communicates with the common groove 15 in part 111. Two seal caps 16 seal the open end of the common groove in each of the two parts 110 and 112. The adjusting passage 18 is defined in the part 19 and a plug 17 is received in the adjusting passage 18.

While we have shown and described various embodiments in accordance with the present invention, it should be clear to those skilled in the art that further embodiments may be made without departing from the scope and spirit of the present invention.

What is claimed is:

1. A hydraulic brake system for a bicycle which has a front brake assembly cooperated with a front wheel, and a rear brake assembly cooperated with a rear wheel, said brake system comprising:

a body having two inlets defined in a first end of said body, said two inlets adapted to be respectively connected to two brake levers, a first outlet and a second outlet respectively defined in a second end of said body, said first outlet adapted to be connected to a front brake assembly, said second outlet adapted to be connected to a rear brake assembly, a common groove defined in said body and located between said two inlets and said first outlet and said second outlet, said two inlets communicating with said common groove by two first passages respectively connected between said common groove and said two inlets, said first outlet communicating with said common groove by a second passage connected between said common groove and said first outlet, said second outlet communicating with said common groove by a third passage connected between said common groove and said second outlet.

2. The brake system as claimed in claim 1 further comprising an adjusting passage defined in said body and said adjusting passage communicating with said common groove, a plug movably received in said adjusting passage.

3. The brake system as claimed in claim 2 further comprising a recess defined in an inner periphery of said common groove, said recess and said adjusting passage sharing a common axis.

4. The brake system as claimed in claim 1, wherein an inner diameter of said second passage is larger than an inner diameter of said third passage.

5. The brake system as claimed in claim 1 further comprising an opening defined in said body and communicating with said common groove, a seal cap engaged with said opening.

* * * * *